United States Patent
Isampalli et al.

(10) Patent No.: US 12,360,964 B1
(45) Date of Patent: Jul. 15, 2025

(54) SYSTEMS AND METHODS FOR APPLICATION PROGRAM INTERFACE (API) SCHEMA COMPLIANCE

(71) Applicant: Wells Fargo Bank, N.A., San Francisco, CA (US)

(72) Inventors: Udaya Isampalli, San Francisco, CA (US); Dinesh Arora, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/626,103

(22) Filed: Apr. 3, 2024

(51) Int. Cl.
  G06Q 40/02 (2023.01)
  G06F 16/21 (2019.01)

(52) U.S. Cl.
  CPC .......... *G06F 16/213* (2019.01); *G06Q 40/02* (2013.01)

(58) Field of Classification Search
  CPC .............................. G06F 16/213; G06Q 40/02
  See application file for complete search history.

(56) References Cited

U.S. PATENT DOCUMENTS

| | | | |
|---|---|---|---|
| 6,859,791 B1 | 2/2005 | Spagna et al. | |
| 6,983,371 B1 | 1/2006 | Hurtado et al. | |
| 8,473,487 B1 | 6/2013 | Verstak et al. | |
| 9,842,218 B1 | 12/2017 | Brisebois et al. | |
| 10,129,289 B1 | 11/2018 | Yang et al. | |
| 10,628,408 B2 | 4/2020 | Jin et al. | |
| 10,725,763 B1 * | 7/2020 | Chud | G06F 11/079 |
| 11,087,761 B2 | 8/2021 | Ward et al. | |
| 11,409,842 B2 | 8/2022 | Seguin | |
| 11,474,935 B2 * | 10/2022 | Kalyanaraman | G06F 11/3688 |
| 11,790,052 B2 | 10/2023 | Seguin | |
| 11,947,563 B1 * | 4/2024 | Nitsopoulos | G06F 16/284 |
| 12,047,512 B1 * | 7/2024 | Kurani | G06Q 40/04 |
| 2002/0035697 A1 | 3/2002 | McCurdy et al. | |
| 2003/0046182 A1 | 3/2003 | Hartman | |
| 2007/0011094 A1 | 1/2007 | Manchala | |
| 2008/0010319 A1 | 1/2008 | Vonarburg et al. | |
| 2010/0114936 A1 | 5/2010 | Gupta | |
| 2010/0250271 A1 | 9/2010 | Pearce et al. | |

(Continued)

OTHER PUBLICATIONS

Extended European Search Report for Appl. Ser. No. EP 20766124 dated Nov. 2, 2022 (10 pages).

(Continued)

*Primary Examiner* — Tarek Chbouki
(74) *Attorney, Agent, or Firm* — Foley & Lardner LLP

(57) ABSTRACT

Systems and methods are described herein for updating an application program interface (API) schema to comply with a standard schema model. Such systems and methods may use a computing system to receive the standard schema model from a third-party repository. The computing system also receives an API schema for a first API of a plurality of APIs maintained by the computing system. The computing system compares the API schema to the standard schema model and computes a compliance score for the API schema based on the comparison. Based on the compliance score, the computing system modifies a configuration of the first API, to update the API schema. The computing system may publish the first API according to the updated API schema, according to an updated compliance score based on the modified configuration.

16 Claims, 6 Drawing Sheets

(56) References Cited

U.S. PATENT DOCUMENTS

| | | |
|---|---|---|
| 2010/0262515 A1 | 10/2010 | Brewer |
| 2012/0131683 A1 | 5/2012 | Nassar et al. |
| 2013/0198609 A1 | 8/2013 | Mokhtarzada et al. |
| 2013/0219262 A1 | 8/2013 | Becker et al. |
| 2014/0237540 A1 | 8/2014 | King et al. |
| 2015/0286737 A1 | 10/2015 | Cattone et al. |
| 2017/0154376 A1 | 6/2017 | Mirchandani et al. |
| 2017/0372043 A1 | 12/2017 | Hurst et al. |
| 2019/0278924 A1 | 9/2019 | Zhang et al. |
| 2021/0124610 A1* | 4/2021 | Gardner ................. G06F 9/4881 |
| 2022/0116480 A1* | 4/2022 | Crisan ..................... H04L 67/01 |
| 2023/0092030 A1* | 3/2023 | Battaglia ................... G06F 8/10 |
| | | 717/104 |
| 2024/0061725 A1* | 2/2024 | Sagar ...................... H04L 67/10 |
| 2024/0168770 A1* | 5/2024 | Velappan ............... G06F 9/541 |

OTHER PUBLICATIONS

International Preliminary Report on Patentability for PCT Appl. Ser. No. PCT/US2020/020894 dated Sep. 16, 2021 (9 pages).
International Search Report and Written Opinion dated May 6, 2020 for PCT/US2020/020894 (10 pages).

* cited by examiner

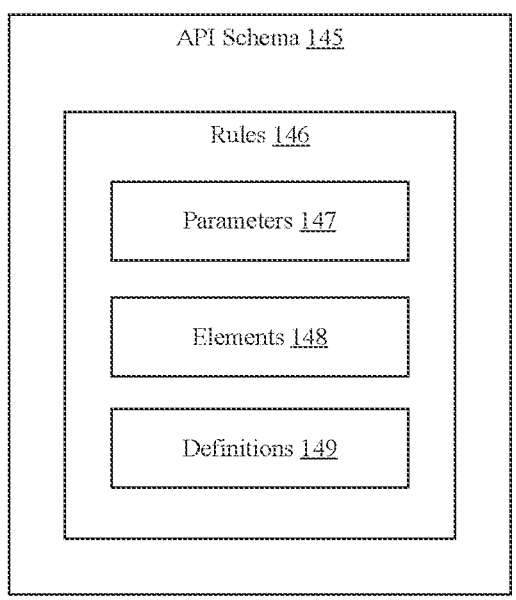
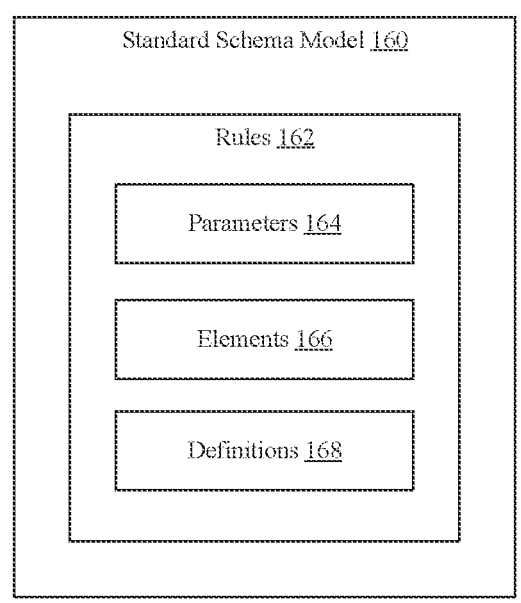
FIG. 3A
FIG. 3B

SYSTEMS AND METHODS FOR APPLICATION PROGRAM INTERFACE (API) SCHEMA COMPLIANCE

TECHNICAL FIELD

The present disclosure relates to systems and methods for application program interface (API) schema compliance. More specifically, the present disclosure relates to systems and methods which determine whether an API schema complies with a standard schema model, and updating the API schema such that it complies with the standard schema model.

BACKGROUND

Some companies, such as financial institutions or other entities, may maintain or manage large volumes of APIs in simultaneous operation. These APIs need to be fully functional for interfacing with various endpoints.

SUMMARY

One embodiment of the invention relates to a computer-implemented method. The method includes receiving a standard schema model from a third-party repository. The method also includes receiving an application program interface (API) schema for a first API of a plurality of APIs maintained by a computing system. The method includes comparing the API schema to the standard schema model. The method includes computing, based on the comparison between the API schema and the standard schema model, a compliance score for the API schema. The method includes modifying a configuration of the first API, to update the API schema, based on the compliance score for the API schema. The method includes publishing the first API according to the updated API schema, according to an updated compliance score based on the modified configuration.

In some embodiments, the standard schema model includes a set of rules compliant with a banking industry architecture network (BIAN) standard. In some embodiments, the third-party repository corresponds to the BIAN standard, and the first API is an API of a financial institution. The standard schema model may include a first set of parameters, definitions, and elements, and the API schema may include a second set of parameters, definitions, and elements. In some embodiments, modifying the configuration of the first API includes modifying at least one of the parameters, definitions, and elements of the second set of parameters, definitions, and elements.

In some embodiments, receiving the API schema for the first API of the plurality of APIs maintained by the computing system includes identifying the first API based on an indication of compatibility with the standard schema model. In some embodiments, updating the API schema may include updating the API schema until the API schema reaches a threshold match percentage with the standard schema model. The method may further include receiving an API schema for a second API of the plurality of APIs maintained by the computing system and replacing the second API with a third API, to update the API schema for the second API. In some embodiments, the API schema for the first API is identified by a matched path and the API schema for the second API is identified by an unmatched path. In some embodiments, the configuration of the first API is modified while the first API is live.

Another embodiment relates to a computing system including a processing circuit including one or more processors and memory, the memory storing instructions that, when executed, cause the processing circuit to receive a standard schema model from a third-party repository. The instructions further cause the processing circuit to receive an API schema for a first API of a plurality of APIs maintained by the computing system. The instructions further cause the processing circuit to compare the API schema to the standard schema model. The instructions further cause the processing circuit to compute a compliance score for the API schema, based on the comparison between the API schema and the standard schema model. The instructions further cause the processing circuit to modify a configuration of the first API, to update the API schema, based on the compliance score for the API schema. The instructions further cause the processing circuit to publish the first API according to the updated API schema, according to an updated compliance score based on the modified configuration.

Another embodiment relates to a non-transitory computer-readable medium storing instructions that, when executed by one or more processors of a processing circuit, cause the processing circuit to receive a standard schema model from a third-party repository. The instructions further cause the processing circuit to receive an API schema for a first API of a plurality of APIs maintained by the computing system. The instructions further cause the processing circuit to compare the API schema to the standard schema model. The instructions further cause the processing circuit to compute a compliance score for the API schema, based on the comparison between the API schema and the standard schema model. The instructions further cause the processing circuit to modify a configuration of the first API, to update the API schema, based on the compliance score for the API schema. The instructions further cause the processing circuit to publish the first API according to the updated API schema, according to an updated compliance score based on the modified configuration.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

Before turning to the Figures, which illustrate certain example embodiments in detail, it should be understood that the present disclosure is not limited to the details or methodology set forth in the description or illustrated in the figures. It should also be understood that the terminology used herein is for the purpose of description only and should not be regarded as limiting.

FIGS. 3A and 3B show a block diagram of an API schema and a block diagram of a standard schema model, respectively, according to an exemplary embodiment.

DETAILED DESCRIPTION

Referring generally to the figures, systems and methods of evaluating and facilitating API compliance with a standard schema model are shown. Various industries may implement industry-standards regarding the APIs that are used at entities throughout the industry. For example, in the banking industry, the banking industry architecture network (BIAN) standard has been introduced as a common framework for financial institutions to adopt in order to promote streamlined conversation between APIs of multiple financial institutions. To adopt the BIAN standard, however, each financial institution is to evaluate each of its existing APIs and determine how, if at all, each of those existing APIs meet the BIAN standard. Because the BIAN standard has such a large domain (e.g., 240 open specification APIs), however, the process of evaluating existing APIs against the BIAN standard and thereafter either updating the existing APIs or creating new APIs to achieve compliance with the BIAN standard presents significant technical challenges and threats to the operation of financial institutions. Additionally, the BIAN standard implements its own unique naming convention, which adds to the challenges of evaluating BIAN compliance.

The present disclosure introduces a simplified process of achieving API compliance with an industry standard using a system that implements a dictionary of subdomains included in the industry standard and computes a compliance score based on an API's compliance with each of the subdomains. By implementing this incremental approach of assessing API compliance with an industry standard, not only is the process simplified, but financial institutions do not have to cease operation/services to convert existing systems and applications to comply with a new standard. Converting an entire operating system to a new standard (e.g., to the BIAN standard) typically requires an entity which provides existing API solutions (e.g., a provider institution) to stop services for a period of time, and for a standard as complex as the BIAN standard, that period of time may be significant. Thus, such entities would benefit from a system that simplifies the process of converting existing programs, systems, and applications (e.g., APIs) in order to comply with a new industry standard without having to pause operations and/or services while the programs, systems, and applications update.

Figure 1:
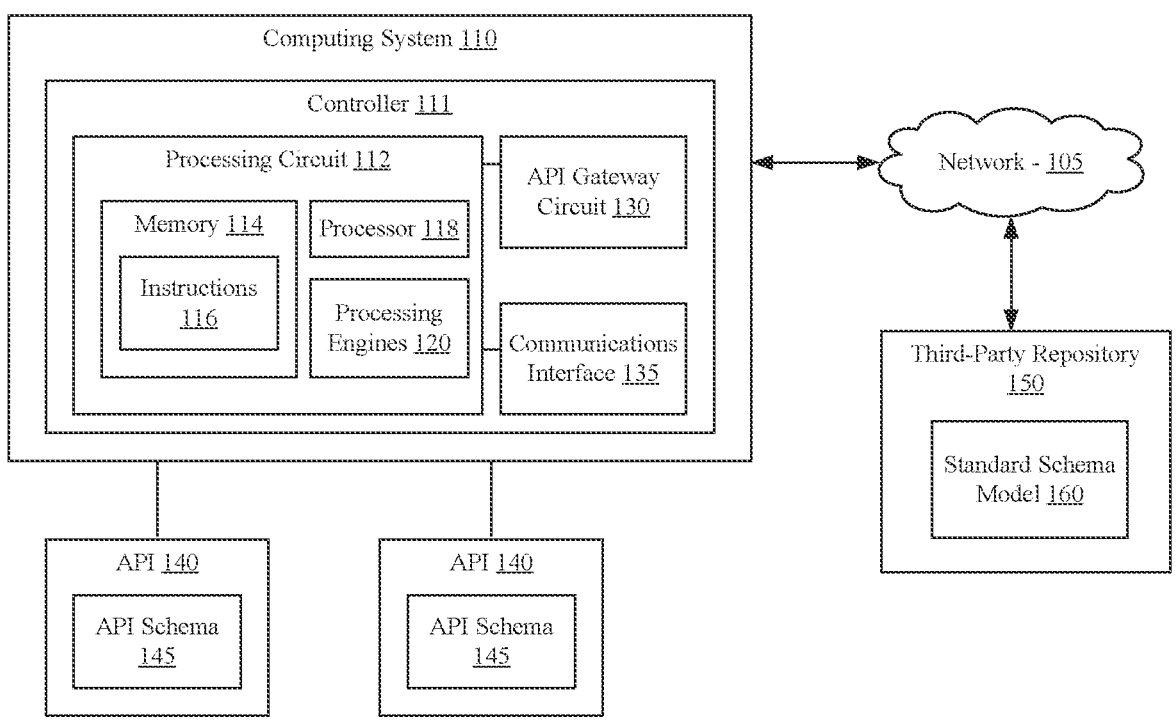
FIG. 1 shows a block diagram of a system for application program interface (API) schema compliance, according to an exemplary embodiment.

Referring to FIG. 1, a block diagram of a system 100 for application program interface (API) schema compliance is shown, according to an exemplary embodiment. In brief overview, the system 100 is shown to include a computing system 110 maintaining, providing, or otherwise managing at least one application programming interface (API) 140 (shown as two APIs 140, but there may be any number of APIs 140) and at least one third-party repository 150. In some embodiments, the computing system 110 may be affiliated with, controlled or maintained by, or otherwise provided by a financial institution, such as a bank. As described in greater detail below, the computing system 110 may be configured to receive, from the third-party repository 150, a standard schema model (e.g., standard schema model 160). The computing system 110 may be configured to receive (e.g., by schema processor 122) an API schema (e.g., API schema 145) from a first API 140. The computing system 110 may be configured to compare (e.g., by comparison engine 124) the API schema 145 from the first API 140 to the standard schema model 160 from the third-party repository 150. The computing system 110 may be configured to compute (e.g., by scoring engine 126) a compliance score for the API schema 145, based on the comparison between the API schema 145 and the standard schema model 160. Based on the compliance score for the API schema 145, the computing system 110 may be configured to modify (e.g., by API modifier 128) a configuration of the first API 140, to update the API schema 145. The computing system 110 may be further configured to publish (e.g., by API gateway circuit 130) the first API 140 according to the updated API schema 145 according to an updated compliance score (e.g., determined by the scoring engine 126) based on the modified configuration of the first API 140.

The computing system 110 is shown to include a controller 111. The controller 111 includes a processing circuit 112 having a memory 114, a processor 118, and processing engines 120. The controller 111 may be configured to transmit, receive, exchange, or otherwise provide data to the third-party repository 150. The controller 111 is shown to include an API gateway circuit 130. The API gateway circuit 130 may be configured to facilitate the transmission, receipt, and/or exchange of data between the controller 111 and the third-party repository 150. The controller 111 may also include, and the processing circuit 112 may be communicably coupled to, a communications interface 135 such that the processing circuit 112 may send and receive content and data via the communications interface 135. As such, the controller 111 may be structured to communicate via one or more networks 105 with other devices and/or applications (e.g., the third-party repository 150). The system 100 is shown to include the third-party repository 150 including third-party data corresponding to one or more standard schemas (e.g., the standard schema model 160). In some embodiments, the controller 111 and the third-party repository 150 may be communicably coupled and configured to exchange data over the network 105, which may include one or more of the Internet, cellular network, Wi-Fi, Wi-Max, a proprietary banking network, a proprietary retail or service provider network, or other type of wired or wireless network.

Referring to FIG. 1 generally, the controller 111 is associated with (e.g., managed and/or operated by) the computing system 110. In the example depicted, the computing system 110 is a computing system configured to maintain data or content relating to one or more APIs (e.g., API 140). According to the embodiments described herein, the computing system 110 may be configured to receive one or more API schema models from the third-party repository 150. For example, the computing system 110 may be configured to receive a standard schema model (e.g., standard schema model 160) from the third-party repository 150. Thus, the controller 111 is structured or configured to evaluate and facilitate a compliance of the API schema 145 of the API 140 with the standard schema model 160, without rendering the API 140 inoperable while updating the API schema 145, to comply with the standard schema model 160. In some embodiments, the controller 111 is structured or configured control access to the API 140 (e.g., by authenticating a user of the API 140).

In some embodiments, the controller 111 may be implemented within a single computer (e.g., one server, one housing, etc.). In other embodiments, the controller 111 may be distributed across multiple servers or computers, such as a group of two or more computing devices/servers, a distributed computing network, a cloud computing network, and/or any other type of computing system capable of accessing and communicating via local and/or global networks (e.g., the network 105). Further, while FIG. 1 shows the API 140 outside of the controller 111, in some embodiments, the API 140 may be hosted within the controller 111 (e.g., within the memory 114).

The controller 111 is also shown to include the processing circuit 112, including the memory 114, the processor 118, and the processing engines 120. The processing circuit 112 may be structured or configured to execute or implement the instructions, commands, and/or control processes described herein with respect to the memory 114, the processor 118, and/or the processing engines 120. FIG. 1 shows a configuration that represents an arrangement where the processor 118 is embodied in a machine. However, FIG. 1 is not meant to be limiting, as the present disclosure contemplates other embodiments, such as where the processor 118, or at least one circuit of processing circuit 112 (or controller 111), is configured as a hardware unit. All such combinations and variations are intended to fall within the scope of the present disclosure.

The processing circuit 112 is shown to include the memory 114. The memory 114 (e.g., memory, memory unit, storage device, etc.) may include one or more devices (e.g., RAM, ROM, Flash memory, hard disk storage, etc.) for storing data and/or computer code for completing or facilitating the processes, layers, and modules described in the present application. The memory 114 may be or include tangible, non-transient volatile memory or non-volatile memory. The memory 114 may also include database components, object code components, script components, or any other type of information structure for supporting the activities and information structures described in the present application. According to an exemplary embodiment, the memory 114 is communicably connected to the processor 118 via the processing circuit 112 and includes computer code for executing (e.g., by the processing circuit 112 and/or the processor 118) one or more processes described herein. The memory 114 stores instructions 116 configured to, for example, cause the processing circuit 112 to perform the operations corresponding to the respective processing engines 120.

The processing circuit 112 is also shown to include the processor 118. The processor 118 may be implemented or performed with a general-purpose single- or multi-chip processor, a digital signal processor (DSP), an application specific integrated circuit (ASIC), one or more field programmable gate arrays (FPGAs), or other suitable electronic processing components. A general-purpose processor may be a microprocessor, or, any conventional processor, or state machine. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., the circuits of the processor 118 may comprise or otherwise share the same processor which, in some example embodiments, may execute instructions stored, or otherwise accessed, via different areas of memory 114). Alternatively or additionally, the processor 118 may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

In some embodiments, the processing circuit 112 may be configured to implement various processing engines 120 (e.g., by the processor 118 executing corresponding instructions in the memory 114). The processing engines 120 may be or include any device, component, element, or hardware designed or configured to perform various dedicated function(s) associated therewith. In some embodiments, the processing engines 120 may include a schema processor 122, a comparison engine 124, a scoring engine 126, and an API modifier 128, all of which are described in greater detail below. The memory 114 stores instructions 116 configured to, for example, cause the processing circuit 112 to perform the operations corresponding to the respective processing engines 120.

As shown in FIG. 1, the controller 111 also includes an application programming interface (API) gateway circuit 130. In some embodiments, external devices (e.g., user devices configured to access an application operated by the computing system 110, entity systems enrolled in one or more services offered by the provider institution associated with the computing system 110, etc.) may include and/or execute API protocols that are used to establish an API session between the controller 111 and the external devices. In this regard, the API protocols and/or sessions may allow the computing system 110 to communicate content and data (e.g., one or more services offered by the computing system 110) to be displayed/provided/rendered directly within the external devices. For example, the external device may activate an API protocol (e.g., via an API call), which may be communicated to the controller 111 via the network 105 and the communications interface 135. The API gateway circuit 130 may receive the API call from the controller 111, and the API gateway circuit 130 may process and respond to the API call by providing API response data. The API response data may be communicated to the external device via the controller 111, communications interface 135, and the network 105. The external device may then access (e.g., display/use/interface with) the API response data (e.g., one or more services offered by the provider institution) on the external device.

As such, the API gateway circuit 130 is structured to initiate, receive, process, and/or respond to API calls (e.g., via the controller 111 and the communications interface 135) over the network 105. That is, the API gateway circuit 130 may be configured to facilitate the communication and exchange of content and data between the external devices (e.g., user devices configured to access an application operated by the computing system 110, entity systems enrolled in one or more services associated with the computing system 110, etc.) and the controller 111. Accordingly, to process various API calls, the API gateway circuit 130 may receive, process, and respond to API calls using other circuits. Additionally, the API gateway circuit 130 may be structured to receive communications (e.g., API calls, API response data, etc.) from other circuits. That is, other circuits may communicate content and data to the controller 111 via the API gateway circuit 130. Therefore, the API gateway circuit 130 is communicatively coupled to other circuits of the controller 111, either tangibly via hardware, or indirectly via software.

As shown in FIG. 1, the controller 111 is shown to include the communications interface 135. The communications interface 135 may be configured for transmitting and receiving various data and signals with other components of the system 100. As shown, for example, network 105 facilitate communication between the computing system 110 and the third-party repository 150 via the communications interface 135. Accordingly, the communications interface 135 can include a wireless network interface (e.g., 802.11X, ZigBee, Bluetooth, Internet, etc.), a wired network interface (e.g., Ethernet, USB, Thunderbolt, etc.), or any combination thereof.

The computing system 110 may include at least one API 140 communicably coupled to/managed by/or otherwise associated with the computing system 110. As shown in FIG. 1, the computing system 110 may include a first API 140 including a first API schema 145 and a second API 140 including a second API schema 145. In some embodiments, the at least one API 140 may be an API associated with one or more programs, services, applications, etc., offered by the computing system 110 to one or more users enrolled in such corresponding one or more programs, services, applications, etc. As shown in FIG. 1, the API 140 may include the API schema 145. The API schema 145 refers to a set of rules (e.g., rules 146, as described in greater detail below with reference to FIG. 3A) configured to allow communication between multiple programs, services, applications, etc. For example, the API schema 145 may be configured to facilitate communication between a plurality of APIs (e.g., API 140) within the computing system 110. Alternatively or additionally, the API schema 145 may be configured to facilitate communication between a plurality of APIs internal to the computing system 110 (e.g., API 140) and external to the computing system 110 (e.g., owned/operation by one or more third-party systems associated with one or more other entities). In order to facilitate communication between a plurality APIs within a same industry, the industry may adopt an industry standard (e.g., the BIAN standard in the banking industry) of APIs within that industry. Therefore, the API schema 145 must be evaluated and updated in order to comply with the industry standard. In some embodiments, the industry standard may include the standard schema model 160 received from the third-party repository 150, as described herein.

The system 100 may include at least one third-party repository 150 (shown as one third-party repository 150, but there may be any number of third-party repositories 150). The third-party repository 150 refers to a data source configured to store third-party data corresponding to one or more standard schemas (e.g., the standard schema model 160). For example, the third-party repository 150 may be associated with an institution (e.g., a regulatory institution) configured to oversee one or more operations of the computing system 110. In this example, the third-party repository 150 may be managed by an entity configured to implement one or more restrictions and/or standards in an industry associated with the computing system 110. The third-party repository 150 may include third-party data related to one or more standard schemas. For example, the third-party data may include the standard schema model 160. The standard schema model 160 refers to a set of rules associated with operation of one or more APIs in an industry associated with the standard schema model 160 (e.g., the banking industry). For example, the standard schema model 160 may include a set of rules compliant with a banking industry architecture network (BIAN) standard to configure a common communication framework between a plurality of APIs in the banking industry.

Figure 2:
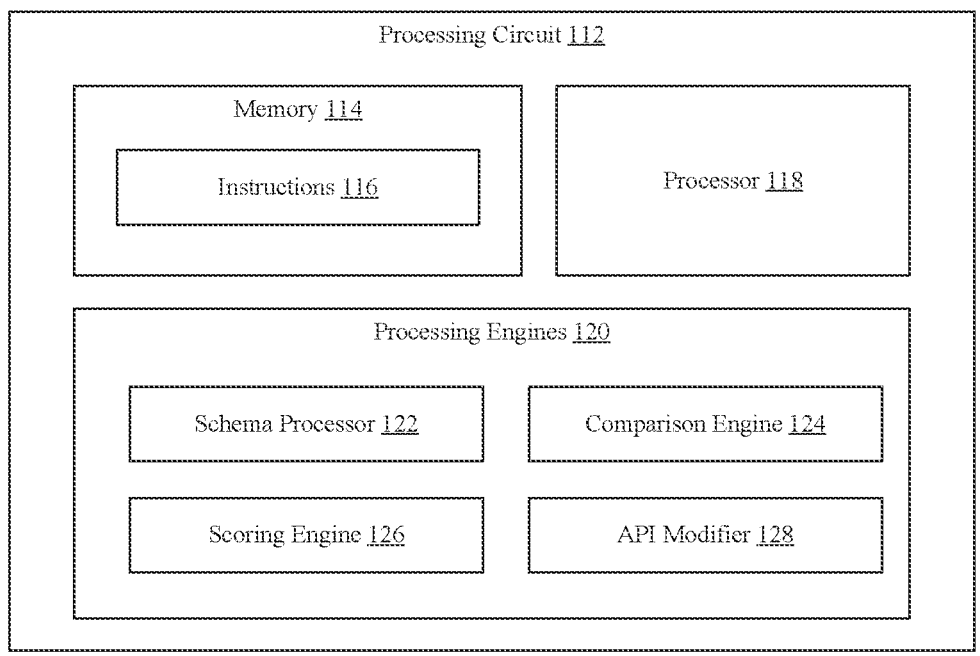
FIG. 2 shows a block diagram of processing engines of the computing system of FIG. 1, according to an exemplary embodiment.

Referring to FIG. 2, a block diagram of the processing circuit 112 included in the computing system 110 of FIG. 1 is shown, according to an exemplary embodiment. The processing engines 120 may include a schema processor 122, a comparison engine 124, a scoring engine 126, and an API modifier 128. The processing engines 120 may be configured to execute any of the functions and/or operations described herein.

The processing engines 120 may include the schema processor 122, as shown in processing circuit 112. The schema processor 122 may be or include any device, component, element, or hardware designed or configured to receive one or more API schemas (e.g., API schema 145, standard schema model 160, etc.). In some embodiments, the schema processor 122 may be designed or configured to identify one or more rules in the one or more API schemas. The one or more rules in the API schemas may include one or more parameters, elements, or definitions that govern the operation of the API schema. In some embodiments, the schema processor 122 may be configured to store the one or more rules associated with a standard schema model (e.g., standard schema model 160) within the memory 114 of the processing circuit 112 such that the schema processor 122 does not have to repeatedly receive the standard schema model 160 from the third-party repository 150. The schema processor 122 may be communicably coupled to the one or more processors 118 and the memory 114 of the processing circuit 112.

The processing engines 120 may include the comparison engine 124, as shown in processing circuit 112. The comparison engine 124 may be or include any device, component, element, or hardware designed or configured to compare at least one API schema (e.g., API schema 145) to a standard API schema (e.g., standard schema model 160). In some embodiments, the comparison engine 124 may receive each of the one or more parameters, elements, or definitions associated with each of the one or more API schemas received by the schema processor 122. The comparison engine 124 may be configured to determine a degree of whether each of the parameters, elements, or definitions identified in an API schema (e.g., API schema 145) of a first API (e.g., API 140) match each of the parameters, elements, and definitions identified in a standard schema model (e.g., the standard schema model 160). The comparison engine 124 may be configured to determine whether each of the parameters, elements, or definitions match by comparing one or more rules, definitions, acceptable input values, etc. in the API schema to those provided in the standard schema model 160. The comparison engine 124 may be communicably coupled to the one or more processors 118 and the memory 114 of the processing circuit 112.

The processing engines 120 may include the scoring engine 126, as shown in processing circuit 112. The scoring engine 126 may be or include any device, component, element, or hardware designed or configured to compute a score based on a comparison of the at least one API schema to the standard API schema (e.g., the comparison determined by the comparison engine 124). The score refers to a numerical value, a percentage, a ratio, a categorical value, etc. that represents the degree of the match between the one or more rules associated with the API schema 145 and the standard schema model 160 identified by the comparison engine 124. For example, if the comparison engine 124 determines that the computer code associated with the API schema 145 matches the computer code associated with the standard schema model 160 exactly, the scoring engine 126 may compute a compliance score of 100% for the API 140 associated with the API schema 145. As another example, if the comparison engine 124 identifies that one definition out of four definitions included in the rules of the standard schema model 160 does not match the definitions included in the rules of the API schema 145, the scoring engine 126 may compute a compliance score of 75%. The scoring engine 126 may be communicably coupled to the one or more processors 118 and the memory 114 of the processing circuit 112.

The processing engines 120 may include the API modifier 128, as shown in processing circuit 112. The API modifier 128 may be or include any device, component, element, or hardware designed or configured to modify a configuration of an API (e.g., API 140). The configuration of the API refers to the one or more rules (e.g., one or more parameters, definitions, and elements) associated with a schema of an API. In some embodiments, the API modifier 128 may be configured to determine, from the comparison engine 124, the one or more rules that do not match between the API schema 145 and the standard schema model 160 and reconfigure the API 140 to include all of the rules identified in the standard schema model 160. The API modifier 128 may be communicably coupled to the one or more processors 118 and the memory 114 of the processing circuit 112.

Referring to FIGS. 3A and 3B, two block diagrams corresponding to two API schemas are shown, according to an exemplary embodiment. FIG. 3A depicts a block diagram corresponding to the API schema 145 of the API 140 from FIG. 1. FIG. 3B depicts a block diagram corresponding to the standard schema model 160 of the third-party repository 150 from FIG. 1.

As shown in FIG. 3A, the API schema 145 may include rules 146. The rules 146 refer to formats, protocols, and the like, that govern the operation of an API (e.g., API 140). In some embodiments, the rules 146 may include parameters 147, elements 148, and definitions 149. The parameters 147 refer to one or more limits, acceptable values, constraints, criteria, etc. used to customize the behavior of the API. For example, the parameters 147 may include query parameters, path parameters, header parameters, form parameters, authentication parameters, pagination parameters, filtering parameters, sorting parameters, versioning parameters, and other custom parameters that control the operation of the API. The elements 148 refer to one or more definitions, factors, features, components, etc. used to dictate the design of an API. In some embodiments, the elements 148 define how one or more software components associated with the API interact with each other. For example, the elements 148 may include endpoints, request methods, request and response formats, error handling, rate limiting, documentation, dependencies, and so on. The definitions 149 refer to one or more paths included in code executable by the API 140 that define one or more functions of the API 140. In some embodiments, the rules 146 may be determined by a provider entity (e.g., a financial institution) associated with the computing system 110.

As shown in FIG. 3B, the standard schema model 160 may include rules 162. The rules 162 refer to formats, protocols, principles, and the like, that define a standard model (e.g., standard schema model 160) to be applied to one or more APIs (e.g., API 140) within a relevant industry. In some embodiments, the rules 162 further include parameters 164, elements 166, and definitions 168. The parameters 164, the elements 166, and the definitions 168 may include similar components as the parameters 147, the elements 148, and the definitions 149, respectively, included in the API schema 145, as described above. While the rules 146 may be determined by a provider entity (e.g., a financial institution) associated with the computing system 110, the rules 162 associated with the standard schema model 160 may be defined by the third-party repository 150 (e.g., BIAN).

Figure 4:
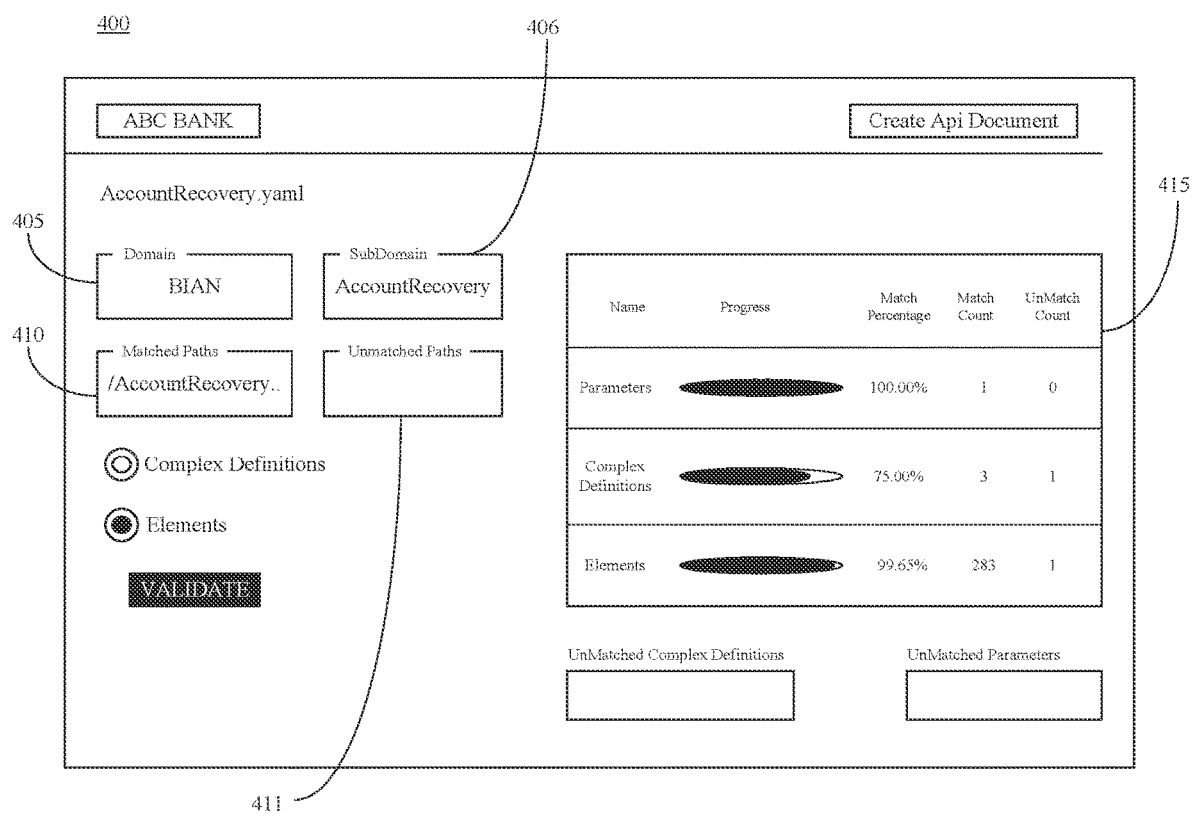
FIG. 4 shows an example graphical user interface (GUI) generated by the system of FIG. 1, according to an exemplary embodiment.

Referring now to FIG. 4, an interface 400 on a user device is shown according to an example embodiment. The user device may be configured to display one or more interfaces including information associated with the API 140. In some embodiments, the interface 400 is generated by the computing system 110. Interface 400 may be generated upon initiation of a conversion of an API (e.g., API 140) to comply with a standard schema (e.g., standard schema model 160).

Still referring to FIG. 4 and in further detail, the interface 400 includes a domain 405, a subdomain 406, matched paths 410, unmatched paths 411, and a compliance table 415, according to an example embodiment. The domain 405 refers to a target schema (e.g., standard schema model 160) to which the API 140 is being converted. For example, as shown in FIG. 4, a financial institution may identify BIAN as the domain 405 (e.g., the target schema/standard schema model) with which the API 140 requires compliance. In some embodiments, the interface 400 further includes a subdomain 406. The subdomain 406 refers to a function of the domain 405 to which the API 140 is being updated to match. For example, if a financial institution operates an API configured to facilitate account recovery, the entity may indicate "Account Recovery" as a subdomain 406 of the BIAN domain 405 which the API facilitating account recovery is being updated to match.

The interface 400 further includes the matched paths 410. The matched paths 410 refer to an API 140 of the computing system 110 that performs the function included in the subdomain 406. The controller 111 may identify the API 140 that performs the function included in the subdomain 406 by identifying (e.g., by the schema processor 122) one or more rules 146 that are configured to perform the function included in the subdomain 406. In some embodiments, the matched paths 410 may be retrieved by one or more API calls to the relevant API 140 associated with the matched paths 410. For example, if the computing system 110 includes an API configured to facilitate account recovery which is updated in order to comply with the BIAN standard, the matched paths 410 may indicate an API 140 entitled "/AccountRecovery/." By indicating the relevant API(s) 140 by the matched paths 410, the computing system 110 is configured to retrieve the API that needs to be updated. In some embodiments, the interface 400 may include unmatched paths 411. The unmatched paths 411 may be associated with a subdomain 406 that is not currently associated with an API 140 of the provider institution. For example, the unmatched paths 411 may include a function indicated by the subdomain 406 that is not identified by the schema processor 122 as performable by the rules 146 of an API schema 145 of an existing API 140 of the provider institution. That is, the unmatched paths 411 may be utilized by the computing system 110 when reaching compliance with the standard schema (e.g., BIAN) indicates that a new API is to be created within the computing system 110, rather than updating an existing API (e.g., identified by the matched paths 410).

In some embodiments, the computing system 110 may receive the domain 405 and/or the subdomain 406 by a user input. For example, the user may include a manager, an executive officer, an associate, or any other personnel associated with the provider institution. The user may provide the domain 405 and/or the subdomain 406 by engaging with a selectable element (e.g., a button, a toggle, a drop-down menu, a free-text entry field, etc.) on the interface 400. In some embodiments, the computing system 110 may receive an indication (e.g., a notification) from a third-party entity (e.g., an entity associated with the third-party repository 150, a regulatory agency associated with the provider institution, etc.) that at least one API 140 associated with the computing system 110 corresponds to a subdomain 406 that is to be updated in order to comply with a domain 405. For example, if the BIAN standard publishes a new standard schema relating to account recovery (e.g., as reflected as a push update or notification from the third-party repository 150), the computing system 110 may receive a notification that there is a new BIAN schema related to account recovery and that the financial institution's API associated with account recovery is to be updated to comply with the new BIAN schema related to account recovery.

After receiving the domain 405 and the subdomain 406 (e.g., by a user input, by a third-party indication, etc.), the computing system 110 may be configured to identify the matched paths 410 related to the subdomain 406. In some embodiments, the computing system 110 may identify the matched paths 410 using a naming convention of the APIs. The naming convention of the APIs refers to a method by which an API may be titled according to the function associated therewith. That is, each API 140 of the computing system 110 may receive a name from the computing system 110 reflective of one or more functions performed by each API 140. For example, an API configured to perform account authentication may be named "Authenticator," an API configured to perform payment processing may be named "PaymentProcessor," an API configured to perform account recovery may be named "AccountRecovery," and so on. The name of each API 140 may be associated with a matched path 410. Therefore, when the computing system 110 receives the domain 405 and the subdomain 406, the computing system 110 may be configured to identify a match between one or more words, subwords, phrases, etc. included in the subdomain 406 and in the name of one or more APIs 140 (e.g., because the naming convention of the APIs associated with the computing system 110 is configured to name each API 140 based on the function/subdomain associated with each API 140).

The interface 400 further includes the compliance table 415. The compliance table 415 refers to a visualization of the results of the comparison engine 124 and the scoring engine 126. That is, the compliance table 415 indicates a current match between the API being updated (e.g., API 140) and the standard schema model associated with that API. As shown in FIG. 4, the compliance table 415 may include a match percentage, a match count, and an unmatch count for each of the parameters (e.g., parameters 147, parameters 164), elements (e.g., elements 148, elements 166), and definitions (e.g., definitions 149, definitions 168) associated with the API schema 145 and the standard schema model 160. As described above with reference to FIG. 2, the comparison engine 124 may be configured to compare each of the parameters, definitions, and elements included in the API schema 145 with the parameters, definitions, and elements included in the standard schema model 160. The match percentage refers to a match percentage (e.g., determined by the scoring engine 126 based on the comparison from the comparison engine 124) relating to each of the parameters, definitions, and elements included in the API schema 145 with the each of the parameters, definitions, and elements, respectively, included in the standard schema model 160. For example, if the standard schema model 160 includes four complex definitions, and the comparison engine 124 identifies three of the four complex definitions in the API schema 145, the match percentage for the definitions may be 75%. Similarly, the match count refers to a number of each of the parameters, definitions, and elements of the API schema 145 that match each of the respective parameters, definitions, and elements of the standard schema model 160. The unmatch count refers to a number of each of the parameters, definitions, and elements of the standard schema model 160 that are not matched (or unmatched) by the parameters, definitions, and elements of the API schema 145.

Figure 5:
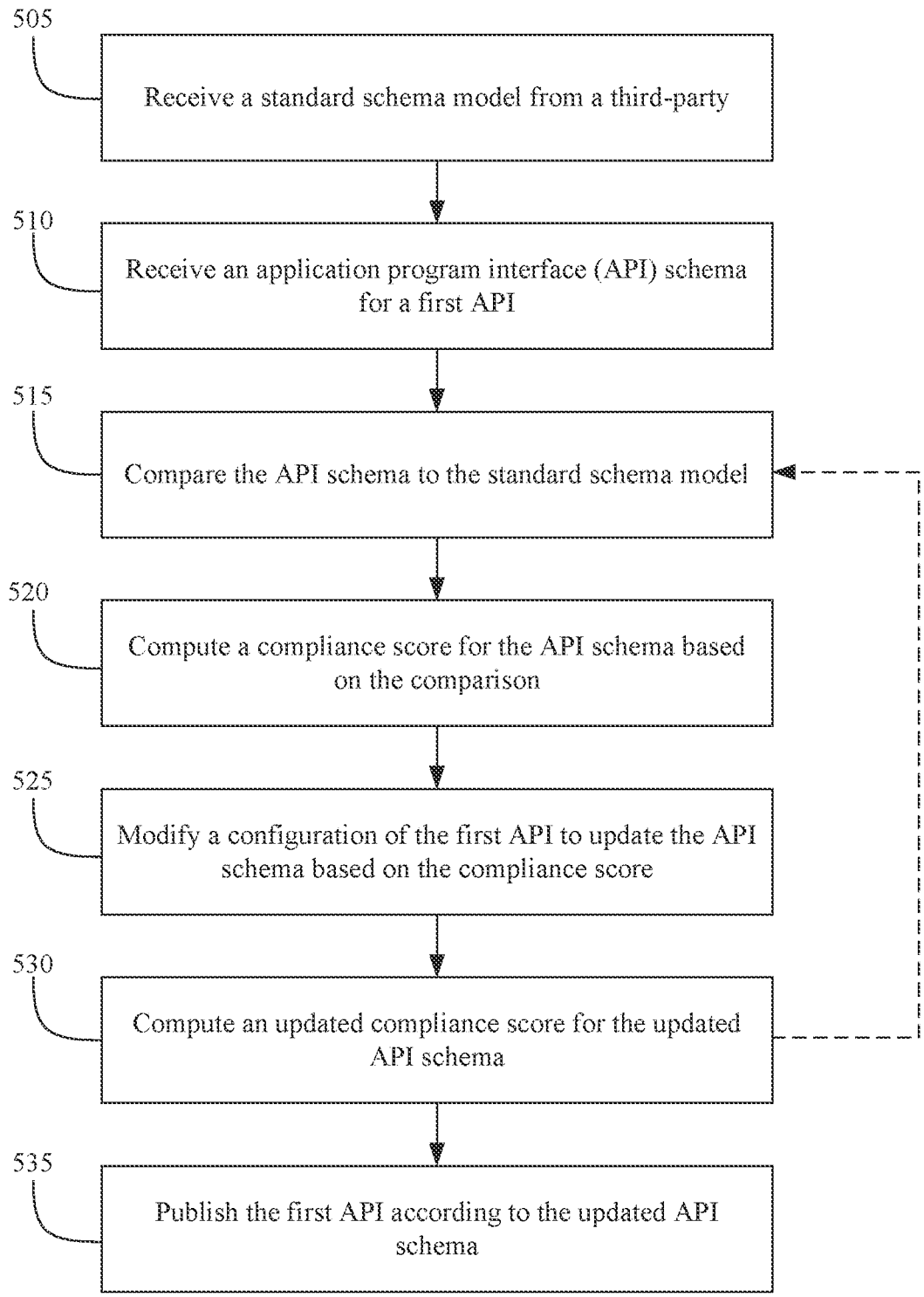
FIG. 5 shows a flowchart of an example method of configuring API schema compliance with a standard schema, according to an exemplary embodiment.

Referring now to FIG. 5, a flow diagram of a method 500 for configuring API schema compliance with a standard schema is shown according to an example embodiment. In some embodiments, the method 500 is performed by the computing system 110. As a brief overview, at step 505, the computing system 110 receives a standard schema model from a third-party repository (e.g., the third-party repository 150). At step 510, the computing system 110 receives an API schema for a first API. At step 515, the computing system 110 compares the API schema of the first API to the standard schema model. At step 520, the computing system 110 computes a compliance score for the API schema of the first API based on the comparison between the API schema of the first API and the standard schema model performed at step 515. At step 525, the computing system 110 modifies a configuration of the first API to update the API schema based on the compliance score determined at step 520. At step 530, the computing system 110 computes an updated compliance score for the updated API schema. At step 535, the computing system 110 publishes the first API according to the updated API schema.

Continuing with FIG. 5 and in more detail, the method 500 begins when the computing system 110 receives the standard schema model from the third-party repository 150 at step 505. In some embodiments, the standard schema model received at step 505 may be the standard schema model 160. The schema processor 122 may receive the standard schema model 160 by retrieving/downloading the standard schema model 160 from the third-party repository 150. In some embodiments, the standard schema model 160 may be associated with a specific domain (e.g., BIAN) in which the APIs are to comply with. The domain may refer to the domain 405 indicated on the interface 400. The standard schema model 160 may also be associated with a particular subdomain (e.g., Account Recovery) indicating the specific API being updated to comply with the indicated domain. The subdomain may refer to the subdomain 406 indicated on the interface 400.

After receiving the standard schema model 160 at step 505, the computing system 110 may receive an API schema from a first API at step 510. In some embodiments, the API schema may be the API schema 145 and the first API may be one of the one or more APIs 140 of the computing system 110. The schema processor 122 may receive the API schema 145 by retrieving/downloading the API schema 145 from the API 140. In some embodiments, the API 140 may be associated with a particular subdomain (e.g., Account Recovery) indicating the functionality of the API being updated. The subdomain may refer to the subdomain indicated on the interface 400. As described above with reference to FIG. 4, the schema processor 122 may identify the API schema 145 corresponding to the subdomain 406 relating to the standard schema model 160 by determining a match between one or more words, subwords, phrases, etc. included in the subdomain 406 and those included in the name of the API 140. After identifying the relevant API 140 by determining a match between the subdomain 406 of the standard schema model 160 and the name of an API 140, the schema processor 122 may retrieve the API schema 145 from that API 140.

In some embodiments, the API schema 145 may be received in response to an API call from the computing system 110. The API call may be initiated by indicating the matched paths 410 on the interface 400 (e.g., "/AccountRecovery/"). Although the systems and methods are described herein with reference to account recovery, the systems and methods may be applied to each API 140 hosted/provided by the computing system 110 (e.g., APIs related to account authentication, payment processing, financial planning, etc.).

The computing system 110 may be further configured to identify one or more periods of high usage associated with the API schema 145 and one or more periods of low usage associated with the API schema 145. The one or more periods of high usage refers to a duration of time (e.g., a twenty-minute interval between the hours of 9 am-11 am EST, a week during the month of February, a 24-hour window between Monday and Thursday, etc.) during which the API schema 145 is in high demand for operation (e.g., in operation for a prolonged period of time, in operation across a large number of user devices, in uninterrupted operation, etc.). The one or more periods of low usage refers to a duration of time (e.g., a ten-minute time interval between the hours of 3 am-4 am EST, a two-day span between the dates of December $23^{rd}$ through January $1^{st}$, a four-hour span between Saturday and Sunday, etc.) during which the API schema is in low demand for operation (e.g., in operation for brief periods of time, in operation across a small number of user devices, in sporadic operation, etc.). Data relating to the periods of high usage and the periods of low usage may be stored by the computing system 110 (e.g., in the memory 114). When the computing system 110 receives the API schema 145 at step 510, the computing system 110 may be further configured to retrieve the data relating to the periods of high usage and the periods of low usage associated with the API schema 145.

After receiving the API schema 145 for the first API 140 at step 510, the computing system 110 compares the API schema 145 to the standard schema model 160 at step 515. In some embodiments, the comparison engine 124 compares the API schema 145 to the standard schema model 160, as described above. For example, comparing the API schema 145 to the standard schema model 160 may include determining whether each of the parameters, elements, and definitions of the standard schema model 160 (e.g., parameters 164, elements 166, and definitions 168) match each of the respective parameters, elements, and definitions of the API schema 145 (e.g., parameters 147, elements 148, and definitions 149). The schema processor 122 may be configured to retrieve the rules 146 (e.g., the parameters 147, the elements 148, and the definitions 149) from the API schema 145 based on documentation (e.g., computer code, examples, instructions, etc.) stored with the API 140 that describe how the API 140 is created and implemented to perform its associated functionality. The comparison engine 124 may be configured to determine whether each of the rules 162 of the standard schema model 160 (e.g., the parameters 164, the elements 166, the definitions 168) have a match among the retrieved documentation including the rules 146 of the API schema 145.

Based on the comparison between the API schema 145 and the standard schema model 160 performed at step 515, the computing system 110 computes a compliance score for the API schema 145 at step 520. In some embodiments, the scoring engine 126 may compute the compliance score for the API schema 145, as described above. The compliance score may include an individual compliance score (e.g., a match percentage) for each of the parameters, elements, and definitions included in the API schema 145. In some embodiments, the individual compliance score for each of the parameters, elements, and definitions included in the API schema 145 may be depicted in the compliance table 415 of the interface 400, as described above with reference to FIG. 4.

The scoring engine 126 may be configured to compute a composite score for each API schema 145 associated with the computing system 110 based on the individual compliance scores. In some embodiments, the composite score may be calculated as the average of each individual compliance score. For example, is there is a 50% match between the parameters 147 of the API schema 145 and the parameters 164 of the standard schema model 160, a 75% match between the elements 148 of the API schema 145 and the elements 166 of the standard schema model 160, and a 100% match between the definitions 149 of the API schema 145 and the definitions 168 of the standard schema model 160, the scoring engine 126 may determine that the composite score associated with the API schema 145 is a 75% match. Therefore, an API schema 145 associated with a higher composite score may be a closer match to/more compliant with the standard schema model 160 than an API schema 145 associated with a lower composite score.

In some embodiments, each of the parameters 147, the elements 148, and the definitions 149 may be associated with an individual weight for determining the composite score. For example, the elements 148 may have a highest weight (e.g., 50%), the parameters 147 may have a second highest weight (e.g., 30%), and the definitions 149 may have a third highest weight (e.g., 20%). Each individual weight (e.g., the highest weight, the second highest weight, and the third highest weight) may determine a weight of the individual score when computing the composite score associated with the API schema 145. Continuing with the same example, if an API schema 145 has a 50% match between the parameters 147 of the API schema 145 and the parameters 164 of the standard schema model 160, a 75% match between the elements 148 of the API schema 145 and the elements 166 of the standard schema model 160, and a 100% match between the definitions 149 of the API schema 145 and the definitions 168 of the standard schema model 160, and the elements 148 have a highest weight of 50%, the parameters have a second highest weight of 30%, and the definitions 149 have a third highest weight of 20%, the scoring engine 126 may compute a composite score of 72.5% associated with the API schema 145 of Based on the compliance score for the API schema 145 computed at step 520, the computing system 110 modifies a configuration of the first API 140 to update the API schema 145 at step 525. In some embodiments, the API modifier 128 may be configured to modify the configuration of the first API 140. Modifying the configuration of the first API 140 may include updating at least one of the parameters 147, the elements 148, and the definitions 149 to match the corresponding parameters 164, elements 166, and definitions 168 of the standard schema model 160. For example, the API modifier 128 may be configured to rewrite one or more components of computer-code included in the API schema 145. After rewriting the one or more components of computer-code included in the API schema 145, the API modifier 128 may propose the revisions to the computer-code (e.g., via a user interface of a user device). The API modifier 128 may receive an acceptance of or a modification to the proposed revisions (e.g., from a user via the user interface of the user device). In some embodiments, if the API modifier 128 receives a modification to the proposed revisions, the API modifier 128 may be configured to further modify the configuration of the first API 140 to reflect the modification.

In some embodiments, the API modifier 128 may be configured to receive the data relating to the periods of high usage and the periods of low usage associated with the API schema 145 and, based on the data, modify the configuration of first API 140 during a period of low usage such that any potential disruptions to the functionality of the API 140 due to the modification of the configuration would occur during a period of low usage rather than during a period of high usage. In some embodiments, the API modifier may be configured to modify a configuration of one or more APIs 140 that require updating according to a priority based on the composite score associated with the API schema 145 of each of the one or more APIs 140. For example, an API 140 associated with an API schema 145 having a composite score of 25% may be prioritized/updated before an API 140 associated with an API schema 145 having a composite score of 98%.

Based on the updated API schema 145, the computing system 110 may compute an updated compliance score at step 530. In some embodiments, the scoring engine 126 may be configured to compute the updated compliance score. After updating the API schema 145, the updated compliance score may include a match percentage of 100% for each of the parameters, elements, and definitions to indicate that the API schema 145 has achieved compliance with the standard schema model 160. Alternatively, if the updated compliance score indicates a match percentage of less than 100% for any of the parameters, elements, or definitions, the computing system 110 may be configured to repeat steps 515, 520, 525, and 530 of method 500 until the updated compliance score computed at step 530 includes a match percentage of 100% for each of the parameters, elements, and definitions.

The computing system 110 may publish the first API 140 according to the updated API schema 145 at step 535. Upon publishing the first API 140, the first API 140 may be made available to one or more users (e.g., entities enrolled in a service offered by the provider entity using the API 140) according to the updated API schema 145. In some embodiments, the computing system 110 may be configured to perform an incremental release (such as an A/B testing) of the updated API schema 145. The incremental release of the updated API schema 145 refers to a process by which the computing system 110 first publishes the API 140 according to the updated API schema 145 to a first set of devices (e.g., "B" devices). After publishing the API 140 according to the updated API schema 145 to the B devices, the computing system 110 may receive feedback according to operations of the API 140 according to the updated API schema 145 (e.g., counts of various types of fault codes, error messages, etc.). While the API 140 according to the updated API schema 145 is published to the B devices, other devices (e.g., "A" devices) may continue to receive the API 140 according to the configuration of the API 140 prior to receiving the updated configuration of the API schema 145 from the API modifier 128. As the API 140 with the updated configuration of the API schema 145 is determined to be operating at or exceeding satisfactory operation, the computing system 110 may publish the updated API 140 incrementally to the remaining devices (e.g., the "A" devices) (e.g., publish the API 140 according to the updated API schema 145 to a greater number of A devices), until the API 140 according to the updated API schema 145 is fully deployed.

Figure 6:
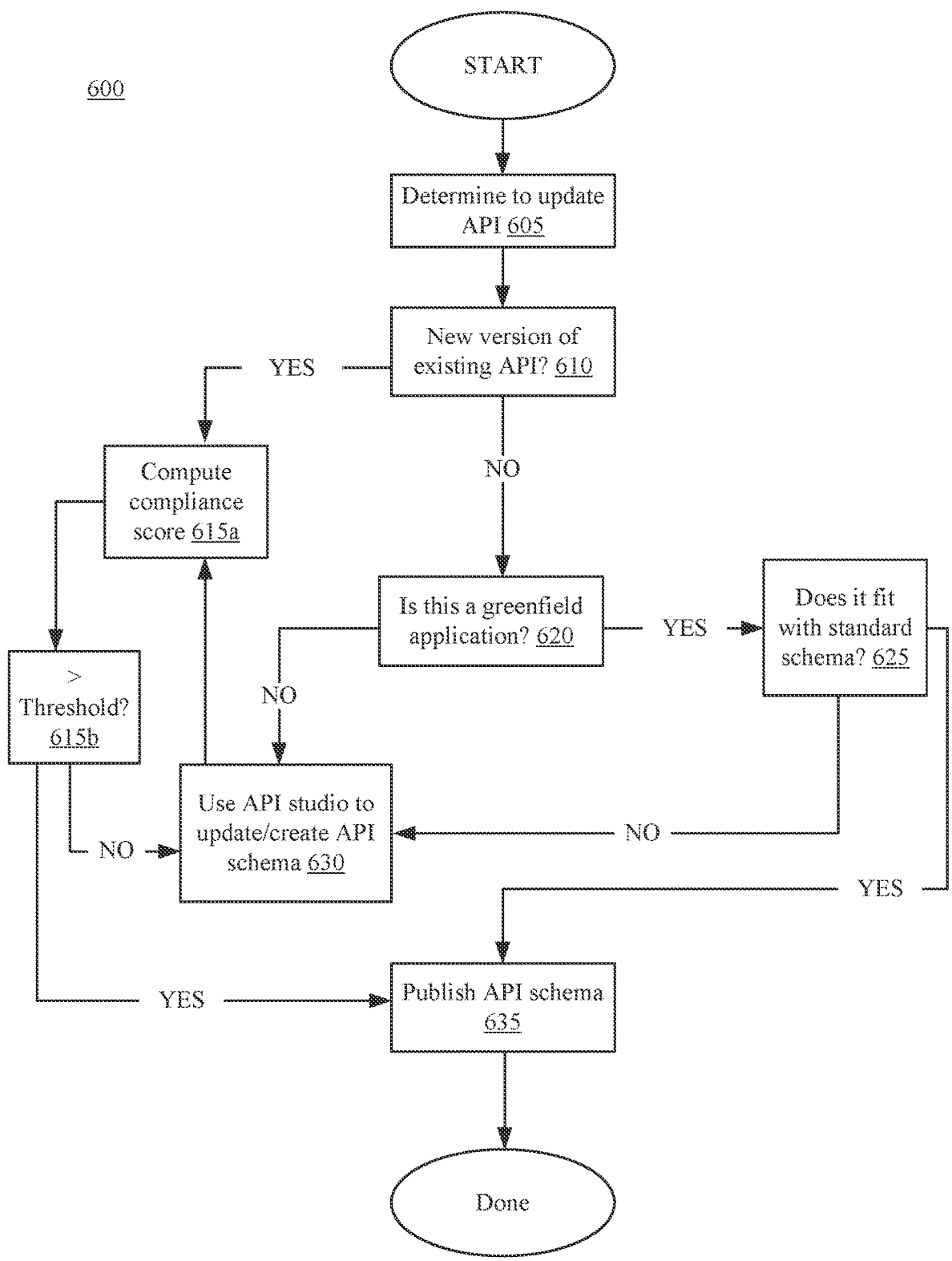
FIG. 6 shows additional steps to the method of FIG. 5 for determining API compliance, according to an exemplary embodiment.

Referring now to FIG. 6, a flow diagram of method additional steps for performing the method 500 of FIG. 5 of configuring API schema compliance with a standard schema is shown according to an exemplary embodiment.

The method 600 begins at step 605, where the computing system 110 determines to update an API. In some embodiments, the computing system 110 may determine to update an API responsive to determining (e.g., by the computing system 110, by the third-party repository 150, etc.) that at least one of the APIs (e.g., API 140) associated with the computing system 110 is non-compliant with at least one industry standard schema (e.g., standard schema model 160).

After determining to update the API at step 605, the computing system 110 determines whether the API may be a new version of an existing API at step 610. The computing system 110 may determine that the API may achieve compliance with the standard schema model 160 using a new version of an existing API if the computing system 110 identifies one or more matched paths (e.g., matched paths 410, as described above with reference to FIG. 4). If the computing system 110 identifies one or more unmatched paths (e.g., unmatched paths 411, as described above with reference to FIG. 4), the computing system 110 may determine that an API compliance with the standard schema model 160 requires an entirely new API (e.g., a greenfield application, as described below). If the computing system 110 determines at step 610 that the API which is to be updated can be executed by generating a new version of an existing API, the computing system 110 may compute a compliance score for the existing API at step 615*a*. In some embodiments, the scoring engine 126 may be configured to compute the compliance score for the existing API. The scoring engine 126 may determine whether the compliance score for the existing API is above or below a predetermined threshold at step 615*b*. If the scoring engine 126 determines that the compliance score for the existing API computed at step 615*a* is above the predetermined threshold, the computing system 110 may publish the API schema at step 635. If the scoring engine 126 determines that the compliance score for the existing API computed at step 615*a* is below the predetermined threshold, the computing system 110 may update the API schema at step 630. After updating the API schema at step 630, the computing system 110 may repeat steps 615*a* and 615*b* until the compliance score computed by the scoring engine 126 at step 615*a* exceeds the predetermined threshold and the API schema is published at step 635.

If the computing system 110 determines at step 610 that the API to update cannot be a new version of an existing API, the computing system 110 may determine whether the API is to be a greenfield application at step 610. A greenfield application refers to an API which is built and developed from scratch (e.g., is not an updated version of an existing API). For example, the if the computing system 110 identifies one or more unmatched paths (e.g., unmatched paths 411) from the standard schema model 160 with regard to the API schema 145, the API may require a greenfield application (e.g., by creating one or more paths where the computing system 110 identifies an unmatched path) in order to achieve compliance with the standard schema model 160. If the computing system 110 determines at step 610 that the API is to be a greenfield application, the computing system 110 may create one or more paths (e.g., by defining a set of rules 146 associated with an API schema 145) that correspond to the unmatched paths from the standard schema model 160. The computing system 110 may then determine whether the greenfield application fits with a standard schema (e.g., standard schema model 160). That is, after creating the greenfield application, the computing system 110 may be configured to perform steps 515 through 530 for the greenfield application to determine whether the greenfield application sufficiently fits within the standard schema (e.g., despite being designed based on the standard schema, the greenfield application may still fail to comply with one or more rules 162 of the standard schema model 160).

If the greenfield application fits with the standard schema, the computing system 110 may publish the API schema at step 635. If the greenfield application does not fit with the standard schema, the computing system 110 may update the API schema at step 630. If the computing system 110 determines at step 610 that that the API needing to be created is not a greenfield application, the computing system 110 may forgo step 625 and may be configured to update the API schema at step 630. After updating the API schema at step 630, the computing system 110 may repeat steps 615a and 615b until the compliance score computed by the scoring engine 126 at step 615a exceeds the predetermined threshold and the API schema is published at step 635.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may include or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general-purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions include, for example, instructions and data which cause a general-purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web embodiments of the present disclosure could be accomplished with standard programming techniques with rule-based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and embodiment of the embodiments without departing from the scope of the present disclosure as expressed in the appended claims.

What is claimed is:

1. A method comprising:
   receiving, by a computing system, a standard schema model from a third-party repository;
   receiving, by the computing system, an application program interface (API) schema for a first API of a plurality of APIs maintained by the computing system;
   identifying, by the computing system, a subdomain of the standard schema model, wherein the first API relates to the subdomain via at least one of a matched path or an unmatched path;
   comparing, by the computing system, the API schema to the subdomain of the standard schema model;
   computing, by the computing system, a compliance score for the API schema, based on the comparing of the API schema and the subdomain of the standard schema model;
   modifying, by the computing system, a configuration of the first API, to update the API schema, based on the compliance score for the API schema, wherein the configuration of the first API is modified by at least one of:
      replacing the API schema of the first API with a second API schema in response to determining that the first API relates to the subdomain via the unmatched path; or
      revising one or more settings of the API schema, to generate an updated API schema, in response to determining that the first API relates to the subdomain via the matched path; and
   publishing, by the computing system, the first API according to the updated API schema, according to an updated compliance score based on the modified configuration.

2. The method of claim 1, wherein the standard schema model comprises a set of rules compliant with a banking industry architecture network (BIAN) standard.

3. The method of claim 2, wherein the third-party repository corresponds to the BIAN standard, and wherein the first API is an API of a financial institution.

4. The method of claim 1, wherein the standard schema model further comprises a first set of parameters, definitions, and elements, and wherein the API schema comprises a second set of parameters, definitions, and elements.

5. The method of claim 4, wherein revising the one or more settings of the API schema comprises modifying at least one of the parameters, definitions, and elements of the second set of parameters, definitions, and elements.

6. The method of claim 1, wherein receiving the API schema for the first API of the plurality of APIs maintained by the computing system further comprises identifying the first API based on an indication of compatibility with the standard schema model.

7. The method of claim 1, wherein updating the API schema further comprises updating the API schema until the API schema reaches a threshold match percentage with the standard schema model.

8. The method of claim 1, wherein the configuration of the first API is modified while the first API is live.

9. A computing system comprising:
   a processing circuit comprising one or more processors and memory, the memory storing instructions that, when executed, cause the processing circuit to:
      receive a standard schema model from a third-party repository;
      receive an application program interface (API) schema for a first API of a plurality of APIs maintained by the computing system;
      identify a subdomain of the standard schema model, wherein the first API relates to the subdomain via at least one of a matched path or an unmatched path;
      compare the API schema to the subdomain of the standard schema model;
      compute a compliance score for the API schema, based on the comparing of the API schema and the subdomain of the standard schema model;
      modify a configuration of the first API, to update the API schema, based on the compliance score for the API schema, wherein the configuration of the first API is modified by at least one of:
         replacing the API schema of the first API with a second API schema in response to determining that the first API relates to the subdomain via the unmatched path; or
         revising one or more settings of the API schema, to generate an updated API schema, in response to determining that the first API relates to the subdomain via the matched path; and
      publish the first API according to the updated API schema, according to an updated compliance score based on the modified configuration.

10. The computing system of claim 9, wherein the standard schema model comprises a set of rules compliant with a banking industry architecture network (BIAN) standard.

11. The computing system of claim 10, wherein the third-party repository corresponds to the BIAN standard, and wherein the first API is an API of a financial institution.

12. The computing system of claim 9, wherein the standard schema model further comprises a first set of parameters, definitions, and elements, and wherein the API schema comprises a second set of parameters, definitions, and elements.

13. The computing system of claim 12, wherein revising the one or more settings of the API schema comprises modifying at least one of the parameters, definitions, and elements of the second set of parameters, definitions, and elements until the API schema reaches a threshold match percentage with the standard schema model.

14. The computing system of claim 9, wherein receiving the API schema for the first API of the plurality of APIs maintained by the computing system further comprises identifying the first API based on an indication of compatibility with the standard schema model.

15. The computing system of claim 9, wherein the configuration of the first API is modified while the first API is live.

16. A non-transitory computer-readable medium storing instructions that, when executed by one or more processors of a processing circuit, cause the processing circuit to:
    receive a standard schema model from a third-party repository;
    receive an application program interface (API) schema for a first API of a plurality of APIs maintained by a computing system;
    identify a subdomain of the standard schema model, wherein the first API relates to the subdomain via at least one of a matched path or an unmatched path;
    compare the API schema to the subdomain of the standard schema model;
    compute a compliance score for the API schema, based on the comparing of the API schema and the subdomain of the standard schema model;
    modify a configuration of the first API, to update the API schema, based on the compliance score for the API schema, wherein the configuration of the first API is modified by at least one of:
        replacing the API schema of the first API with a second API schema in response to determining that the first API relates to the subdomain via the unmatched path; or
        revising one or more settings of the API schema, to generate an updated API schema, in response to determining that the first API relates to the subdomain via the matched path; and
    publish the first API according to the updated API schema, according to an updated compliance score based on the modified configuration.

\* \* \* \* \*